United States Patent [19]
Hernqvist

[11] 3,947,781
[45] Mar. 30, 1976

[54] LASER DEVICE

[76] Inventor: Karl Gerhard Hernqvist, 667 Lake Drive, Princeton, N.J. 08540

[22] Filed: Feb. 27, 1975

[21] Appl. No.: 553,638

[52] U.S. Cl. ......... 331/94.5 D; 330/4.3; 331/94.5 T
[51] Int. Cl.² ........................................... H01S 3/02
[58] Field of Search ..................... 331/94.5; 330/4.3

[56] References Cited
UNITED STATES PATENTS

| | | | |
|---|---|---|---|
| 3,469,207 | 9/1969 | Solomon et al. | 331/94.5 D |
| 3,670,261 | 6/1972 | Halsted et al. | 331/94.5 D |
| 3,878,479 | 4/1975 | Heising et al. | 331/94.5 D |

*Primary Examiner*—William L. Sikes
*Attorney, Agent, or Firm*—Don J. Flickinger

[57] ABSTRACT

To prevent deleterious effects from the sputtering of the cathode of a laser, the cathode surface portions exposed to the gaseous filling within the laser envelope are coated with a vaporizable metal. The coated cathode surface portions are held during laser operation at a temperature within a small range of values including the vaporization temperature of the metal coating the cathode surface. The atoms of the coating metal are sputtered off of the cathode surface by ion bombardment during operation but are immediately redeposited from the vapor of the coating metal adjacent to the cathode surface. Cataphoretic containment of the metal vapor within the central portion of the laser envelope is obtained by providing access to the cathode electrode from an anode electrode in each end of the envelope only through insulating tubular members having a length-to-inner diameter ratio greater than 2 and optimally around 5.

17 Claims, 3 Drawing Figures

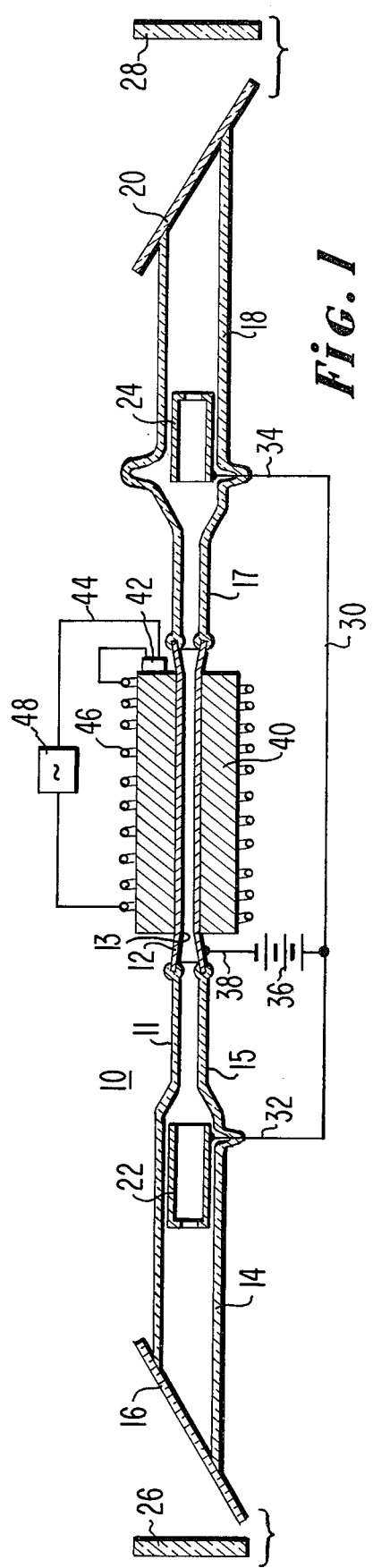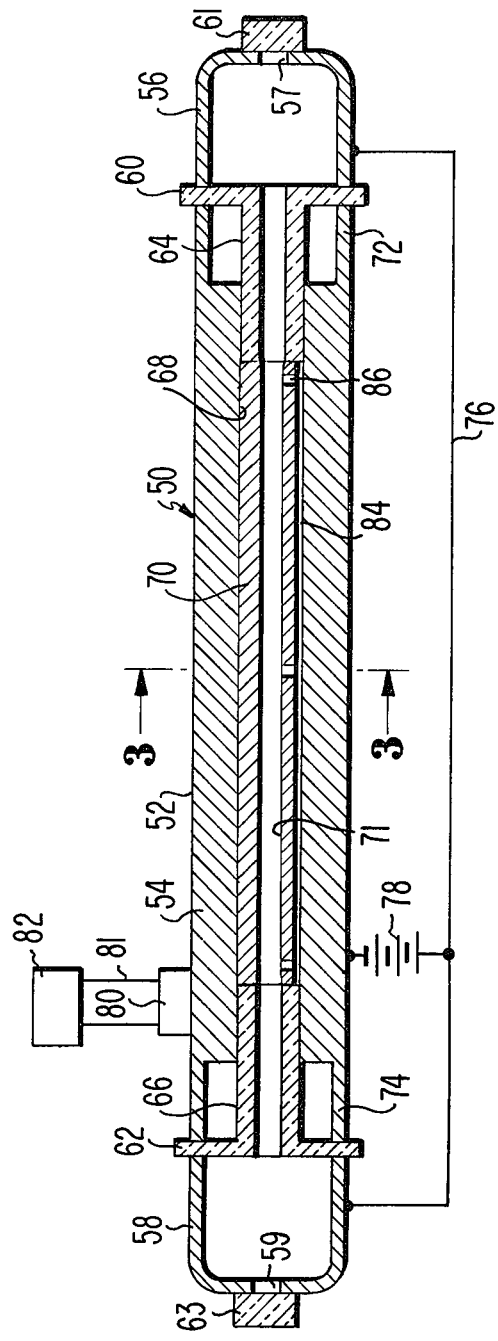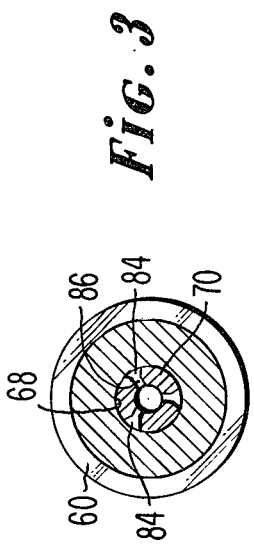

LASER DEVICE

This invention is directed to a laser device and in particular to a hollow cathode laser tube of the type comprising an anode electrode and a cathode electrode within an envelope having a gaseous filling. Surface portions of the anode and cathode electrodes are exposed to the gaseous filling to provide a gaseous discharge within the envelope between the electrodes.

BACKGROUND OF THE INVENTION

A laser device having a hollow cathode has many advantageous characteristics compared to one utilizing a small capillary discharge tube. The hollow cathode laser can be fabricated simply, resulting in a low-cost laser device. It lends itself to the use of ceramic and metal parts which can be brazed together to form a rugged tube structure. The design has a compactness, which is not often obtained with other types of lasers and it can be provided with a short overall length, as compared to most laser devices. A hollow cathode metal vapor laser can be operated at low voltages, around 300 volts, thus requiring only a simple power supply for its operation. The hollow cathode laser provides, in some applications, light emission of wavelengths not found in a capillary laser tube using the same lasing materials. Since the hollow cathode laser operates with a positive voltage-to-current characteristic, modulation of the laser output can be accomplished simply by varying the discharge current.

However, it is well recognized that hollow cathode lasers have severe material problems. For example, the cathode electrode of a laser using a metal vapor undergoes an intense ion bombardment, which causes a rapid sputtering of the cathode surface metal. After only a few hours of operation, the sputtered material covers insulating surfaces and obstructs the optical paths through the laser bore. The sputtering action also may cause the cathode to disintegrate and loss in the gaseous filling.

SUMMARY OF THE INVENTION

In accordance with this invention, the cathode surface is protected from sputtering due to ion bombardment by a coating of vaporizable metal held at a temperature within a small range of values including the vaporization temperature of the metal coating. The protective metal coating is sputtered off and is immediately redeposited from its vapor phase to maintain a constant coverage of the cathode surface.

The total cathode surface exposed to the gaseous filling within the tube is held at substantially the same temperature to assure a uniform covering of the metal coating over the cathode surface. Means are provided for heating the cathode to the temperature at which the coating is retained on the cathode surface, or if the cathode normally operates above this temperature, the means would include structure for cooling the cathode and holding it at the required temperature.

The metal vapor is contained within a central cathode region of the envelope by cataphoretic action obtained by providing access to the cathode region from an anode electrode in each end portion of the laser envelope only through insulating tubular members, each having a length-to-inner diameter ratio greater than 2 and optimally around 5.

DESCRIPTION OF THE DRAWINGS

FIG. 1 is a longitudinal sectional view of a laser device, in accordance with a first embodiment of the invention.

FIG. 2 is a longitudinal, sectional view of a laser device, in accordance with a second embodiment of the invention.

FIG. 3 is a sectional view of the device of FIG. 2 in the plane 3-3.

The laser device 10 of FIG. 1 comprises a closed envelope 11 having a gaseous filling. A cathode electrode 12 comprises a metal tube, such as of molybdenum forming a portion of the envelope. The cathode tube 12 has an inner tubular surface 13, exposed to the gaseous filling within the envelope. To one end of the tube 12 is sealed one end of a glass tubular member 14 coaxially aligned along the axis of tube 12. The opposite end of the glass tubular member 14 is closed by an optical element, such as a light-transparent window 16 positioned at Brewster's angle to the axis of member 14. At the opposite end of the cathode tube 12 is sealed one end of a second glass tubular member 18 coaxially alinged with tube 12. Tubular member 18 is also closed by a light transparent window 20 inclined at Brewster's angle to the axis of the laser device. Tubular portions 15 and 17 of the glass members 14 and 18 have small internal diameters close to the value of the internal diameter of cathode tube 12.

Within the tubular member 14 is mounted a tubular anode electrode 22, which is positioned between the window 16 and the cathode tube 12 and coaxially with the tube 12 and the tubular member 14. In a similar manner, a second tubular anode 24 is coaxially mounted in the tubular member 18 between the cathode tube 12 and the window 20. A pair of reflecting mirrors 26 and 28 are spaced from respectively opposite ends of the envelope 11 and in alignment with the common axis of the laser device, whereby the tubular anode and cathode electrodes enclose portions of the optical cavity of the laser. The anode electrodes 22 and 24 are connected by an appropriate circuit 30 through leads 32 and 34, respectively sealed through the glass walls of the tubular members 14 and 18. Circuit 30 connects the anodes to a positive potential terminal of a voltage source 36 and the cathode tube 12 is connected to a negative terminal of the power source 36 through a lead 38.

In fabricating the laser device of FIG. 1, a sufficient amount of a vaporizable metal, for example, cadmium, is inserted within the envelope 11 together with an amount of helium gas. The potential difference applied by circuit 30 between the cathode tube 12 and the two anode electrodes 22 and 24 initiates a gaseous discharge within the envelope, which supports a lasing action of the cadmium ions. Light from this action is reflected between mirrors 26 and 28 and is transmitted through at least one of the mirrors to provide an output light beam from the laser.

During the operation of metal vapor lasers, of the type shown in FIG. 1, wherein the cathode is a hollow tubular member forming a portion of the optical cavity of the laser, the surface of the cathode exposed to the gaseous filling within the tube undergoes a severe ion bombardment by the heavy metal ions of the discharge, which causes a rapid sputtering away of the cathode material. This seriously limits the life of the laser due to the sputtered material being driven onto the insulating surfaces and onto portions of the optical path along the laser axis. The sputtering can also be so intense as to cause portions of the cathode to disintegrate.

In accordance with the invention, the gaseous filling within the laser envelope includes the vapor of a metal. The cathode surface exposed to the gaseous filling within the laser envelope is maintained at a temperature within a small range of values including the vaporization temperature of the metal vapor. At this temperature, the cathode surface will sorb over its surface a film of the metal which is protective and prevents sputtering of the cathode electrode surface by ion bombardment. The metal of the protective film is sputtered off instead and is immediately redeposited from the vapor of the metal within the hollow cathode.

In the embodiment of FIG. 1, the inner surface 13 of the cathode electrode 12, which is exposed to the gaseous filling of helium and cadmium vapor, is held at a temperature within a small range of values including the vaporization temperature of the cadmium vapor. During operation of the laser, the exposed cathode surface 13 at this temperature sorbs a film of cadmium. Cadmium atoms are sputtered off by the ion bombardment, but are immediately redeposited from the cadmium vapor within the cathode electrode 12. The protective film of cadmium prevents the sputtering of the metal surface 13 of the cathode electrode 12. It is best that all of the cathode surface 13, which is exposed to the gaseous filling of the laser, be kept at an equitemperature to assure a uniform covering of the cadmium metal over the cathode surface. If one part of the cathode surface 13, for example, becomes too hot, the cadmium film will be driven off and the exposed cathode surface portion will be subject to sputtering damage.

The film of cadmium is formed on the cathode surface 13 when the cathode surface is held at or close to the temperature of vaporization of cadmium. For optimum operation of a cadmium laser this temperature may be about 300°C. This temperature is not critical within a small range of values of 10 to 20 degrees. To maintain all of the cathode at substantially an equitemperature, a heavy copper block 40 is fitted around the outer surface of the cathode tube 12 and in intimate contact with the tube 12 to provide a good heat transfer between the block 40 and the cathode tube 12. A thermostatic control 42 is attached to the metal block 40 and is connected in series in a circuit 44 with a heating coil 46 wrapped around the outer surface of the block 40 and with a source of electrical energy 48. It may be necessary, if the operating temperature of laser 10 is above the vaporization temperature of the cadmium, to provide a means for cooling the cathode tube 12 from the higher temperature to a temperature within the small range of operative values including the vaporization temperature of the cadmium. Appropriate cooling devices are known and can be used as the operative conditions dictate.

It is a well-known fact that in thermodynamic equilibrium the metal vapor pressure is directly related to the temperature of vaporization of the metal. We define here the temperature of vaporization as that corresponding to the metal vapor pressure outside the cathode surface. This metal vapor pressure is in turn related to the temperature of the cadmium reservoir in the tube.

A cathode surface immersed in a cadmium vapor will reach an equilibrium coverage of cadmium, at which point the rate of arrival of cadmium atoms or ions equals the rate of departure of cadmium from the surface. Two groups of cadmium particles arrive at the surface, namely 1. neutral atoms from the vapor phase $$\Gamma_{a1} = \frac{1}{4} N_{Cd} \bar{c} \left( \frac{\text{atoms}}{\text{cm}^2 \text{ sec}} \right),$$

where $N_{Cd}$ is the vapor density of cadmium outside the cathode surface, and $\bar{c}$ is the average thermal velocity of cadmium;

2. cadmium ions from the plasma $$\Gamma_{a2} = J_p/e \left( \frac{\text{ions}}{\text{cm}^2 \text{ sec}} \right),$$

where $J_p$ is the ion current density directed towards the cathode surface and $e$ is the electronic charge.

Also two groups of cadmium atoms depart from the surface, namely 1. cadmium atoms sputtered away by the impinging ions $$\Gamma_{d1} = \kappa J_p/e \left( \frac{\text{atoms}}{\text{cm}^2 \text{ sec}} \right),$$

where $\kappa$ is the sputtering yield (atoms sputtered per ion)

2. desorption rate of cadmium atoms $$\Gamma_{d2} = K_2 \exp(-\phi_d/kT_2) \left( \frac{\text{atoms}}{\text{cm}^2 \text{ sec}} \right)$$

where $K_2$ varies slowly with cadmium coverage, $\phi_d$ is the desorption heat which decreases with coverage, $T_2$ is the cathode temperature, and $k$ is the Bolzmann constant.

In equilibrium $$\Gamma_{a1} + \Gamma_{a2} = \Gamma_{d1} + \Gamma_{d2}$$

The equation shows that the surface coverage of cadmium depends on surface temperature $T_2$.

Temperature $T_2$ is defined as being at or near the vaporization temperature of cadmium, when the equilibrium equation yields a surface coverage of cadmium equal to a substantial fraction of a monolayer.

A further feature of the embodiment of FIG. 1 is the positioning of the anode electrodes 22 and 24 between the cathode tube 12 and the optical elements 16 and 20. This arrangement of electrodes causes the positive metal ions to be repelled from the anode electrodes toward the tubular cathode 12 and results in a cataphoretic action which retains the cadmium vapor within the cathode tube 12. Thus, the cadmium does not drift to cooler portions of the envelope where it would be condensed and be lost to the operation of the laser device. This cataphoretic containment of the cadmium vapor prevents the metal vapor from drifting to the optical windows 16 and 20, where it would condense and reduce light transmission through the windows. The cataphoretic containment of the cadmium vapor enables the use of a single, more expensive isotope of the cadmium metal without loss of the metal during the operation. The length-to-inside diameter ratio of the glass envelope portions 15 and 17 between the cathode tube 12 and anodes 22 and 24, should be above 2 and typically 5 or more to maximize the cataphoretic action. The length of cathode tube 12 is around 20 millimeters and its inside diameter and those of tubular portions 15 and 17 are around 3 millimeters.

A second embodiment of the invention which retains all of the advantages of the device of FIG. 1 is disclosed in detail in FIG. 2. The device 50 of FIG. 2 consists of a tubular envelope 52 having a gaseous filling of cadmium and helium and comprising a heavy thick cathode tube 54 formed of Kovar (Trademark) with an axial bore 68. A thin metal sleeve 70 of molybdenum is tightly fitted into the bore 68 to form the cathode surface 71 exposed to the gaseous filling of the envelope. Tube 54 is coaxially joined to a pair of anode cups 56 and 58, respectively, which are sealed by their rims to surfaces of ceramic wafers 60 and 62. To the opposite surfaces of the ceramic wafers are heremetically sealed the ends of the cathode tube 54, as shown. Each wafer 60 and 62 includes a tubular boss 64 and 66, respectively, which are tightly fitted into the opposite ends of the bore 68.

The ends of the cathode tube 54, which are sealed to the two ceramic discs 60 and 72, are machined to provide relatively thin wall portions 72 and 74 of the cathode. These wall portions form heat dams to further aid in maintaining the cathode tube 54 at the operating temperature required. Through the bottom of each anode cup is formed a respective aperture 57 and 59 aligned with the axis of cathode tube 54. Light reflecting mirror blocks 61 and 63 are sealed across the apertures 57 and 59 to form an optical cavity extending between the mirror blocks along the common axis of the cathode and anode electrodes.

The anode electrodes 56 and 58, as well as the cathode tube 54, are connected into an operative circuit 76 with a voltage power source 78 to provide a gaseous discharge between the anodes 56 and 58 and cathode 54. The means provided to maintain the inner exposed cathode surface 71 at a temperature within a small range of values including the vaporization temperature of cadmium may be of any appropriate kind and may include a thermostat control 80 connected into an electrical circuit 81 with a known device 82 for either heating or cooling the heavy cathode tube 54 as the operating conditions require.

As shown in FIGS. 2 and 3, the thin cathode tube 70 has a plurality of slots forming recesses 84 extending longitudinally between the two cathode tubes 54 and 70. Passageways 86 extend from the slots or recesses 84 to the exposed inner surface 71 of the thin tube 70. The cadmium on the inner cathode surface 71 will diffuse through passages 86 into recesses 84 to provide a substantial source of cadmium metal during laser operation. The recesses 84 may be formed in either tube 54 or 70.

The design of the laser device of FIGS. 2 and 3 permits the inner exposed surface 71 of the cathode to be formed of a refractory metal, such as molybdenum, and the massive thick tube 54 to be of a less expensive metal, such as Kovar (Trademark) or copper, having good heat conductivity. A single-piece, massive, thick metal tube may be used as an alternate structure, wherein the recesses 84 are formed within the cathode tube below the surface of the central bore.

The tubular bosses 64 and 66 are provided with an operable length-to-inside diameter ratio to support a cataphoretic action which prevents the cadmium vapor from moving through the ceramic bosses 64 and 66 into the anode regions of the envelope.

GENERAL CONSIDERATIONS

The embodiments described above use a gaseous filling of helium and cadmium. Also, cadmium is used as the protective metal coating over the exposed cathode coating. Other metals may be used in place of cadmium, such as zinc, strontium, lead, antimony and selenium, as examples. The metal used need not be a lasing material, if the presence of the metal vapor as part of the gaseous filling does not restrict the lasing action of the laser. The melting temperature of the cathode material must always be higher than the vaporization temperature of the coating metal.

The design of the device of FIGS. 2 and 3, provides a simple, inexpensive structure, which may be as short as 10 cm. in length. Longer laser tubes can be fabricated using this design as one segment of a multisegment tube. The cathodes would be similar to tube 54, and would be assembled along a common axis alternating with open anode rings separated from the adjacent cathodes by ceramic spacers similar to washers 60 and 62.

As mentioned above in the laser device of FIGS. 1 and 2 the arrangement of the anode electrodes, one at each end of the cathode electrode, during laser operation provide a cataphoretic pumping action, which retains the cadmium vapor within the hollow cathode electrodes. This prevents dissipation of the cadmium metal to other parts of the laser envelope where it would condense and thus shorten the life of the laser. Because of this retention of the cadmium metal within the plasma discharge, it is economically feasible to use a more expensive single isotope, such as cadmium 114. Use of the pure isotope increases the laser gain four times for the same length of the envelope. This permits the use of shorter laser envelopes around 10 centimeters in length.

The laser devices described are embodiments of the invention specifically applied to hollow cathode lasers. The invention is equally applicable to any cathode electrode exposed to an ion bombardment which induces a deleterious sputtering of the exposed cathode surface during laser operation. The cathode electrode need not be a portion of the laser envelope, although it is easier to maintain the operating temperature of the cathode, if it is accessible outside of the laser envelope. The anode electrodes have been described and shown as annular electrodes. The anode may be of other configurations, such as single wire electrodes, for example.

The above described cataphoretic containment action is dependent upon the laser envelope 11 in FIG. 1 being divided by the tubular glass insulator portions 15 and 17, and the envelope 52 in FIG. 2 being divided by the ceramic insulator washers 60 and 62 into end portions and a central portion. Thus, the anode electrodes in each end portion of the envelope have access to the respective cathode electrode in the central envelope portion only through the tubular insulator portions 15 and 17, and 64 and 66. The retention of the metal vapor within the central cathode portion of the envelope increases with the ratio of the length-to-inside diameter of the insulator portions 15, 17, 64 and 66. The ratio should be greater than 2 and optimally around 5. A ratio larger than 7 is operable but unnecessarily lengthens the laser envelope. The central portion of the laser envelope need not be limited to a single cathode electrode, as shown. A plurality of cathode electrodes alternating with anode electrodes may be placed within the central envelope portion and cataphoretic containment of the metal vapor within this central envelope portion can be achieved as described.

I claim:

1. A laser device comprising a closed envelope, a gaseous filling within said envelope, an anode electrode and a cathode electrode having surface portions within said envelope exposed to said gaseous filling, said cathode surface portions being coated with a vaporizable metal, and means for retaining said coated cathode surface portions at a temperature within a small range of values including the vaporization temperature of said vaporizable metal.

2. The laser device in accordance with claim 1, wherein the vaporizable metal is a lasing material in its vapor form.

3. The laser device in accordance with claim 1, wherein the cathode temperature retaining means includes a metal block in intimate contact with said cathode electrode, and means connected to said metal block to maintain the temperature of said block within said small range of values.

4. The laser device in accordance with claim 3, wherein said cathode electrode is a portion of said envelope with an external part of said cathode extending outside of said envelope, said metal block being in intimate contact with said external cathode part.

5. The laser device in accordance with claim 3, wherein said cathode electrode is a hollow metal tube forming a part of said envelope with the outer surface of said metal tube being external of said envelope, said metal block being in intimate contact with said outer tube surface.

6. The laser device in accordance with claim 1, wherein said cathode electrode is a thick metal block and forms a part of said means for retaining said coated cathode surface portions at said temperature.

7. The laser device in accordance with claim 1, wherein said cathode is a thick metal tubular block, having an axial bore, said coated cathode surface portions extending along said bore, said cathode block forming a part of said cathode temperature retaining means.

8. A laser device in accordance with claim 1, wherein said cathode electrode comprises a hollow metal tube axially aligned with two optical elements, each of said optical elements spaced from a different end of said metal tube, said anode electrode comprising an annular member spaced from and coaxial with said metal tube and positioned between one of said optical elements and said metal tube, and a second anode electrode comprising a second annular member spaced from and coaxial with said metal tube and positioned between the other one of said optical elements and said metal tube.

9. A laser device comprising an envelope, a gaseous filling within said envelope, an anode electrode, having at least a part thereof, within said envelope, a tubular cathode electrode spaced from said anode electrode and forming a portion of said envelope with the outer surface of said tubular cathode electrode being external of said envelope, the inner tubular surface of said cathode electrode being within said envelope and coated with a vaporizable metal, and means for retaining said coated cathode surface at a temperature within a small range of values including the condensation temperature of said vaporizable metal.

10. A laser device in accordance with claim 9, wherein said cathode electrode includes at least one recess formed within the cathode electrode and spaced from said inner coated surface, and a passage connecting said recess with said inner coated cathode surface.

11. A laser device in accordance with claim 9, wherein said tubular cathode electrode includes a thick heat-conductive metal tube with a central coaxial bore therethrough, a thin metal tube tightly fitted coaxially within said bore, the inner surface of said thin metal tube forming said inner tubular cathode surface.

12. A laser device in accordance with claim 11, including at least one recess between said thin metal tube and said thick metal tube, and a passage through said thin metal tube connecting said recess with said coated inner thin-tube surface.

13. A laser device in accordance with claim 9, including first and second ceramic washers each having a central aperture therethrough, said envelope including a metal cup coaxially sealed around its lip to one surface of said first ceramic washer, said tubular cathode electrode being coaxially sealed around one end to the other surface of said first ceramic washer and coaxially sealed around its other end to one surface of said second ceramic washer, and said envelope including a tubular electrode coaxially sealed around one end to the other surface of said second ceramic washer, said metal cup comprising said anode electrode and said tubular electrode comprising a second anode electrode.

14. A laser device in accordance with claim 9, including a first and second ceramic washer each having a central aperture therethrough, said envelope including a first metal cup coaxially sealed around its lip to one surface of said first ceramic washer, said tubular cathode electrode being coaxially sealed around one end to the other surface of said first ceramic washer, and coaxially sealed around its other end to one surface of said second ceramic washer, a second metal cup forming another portion of said envelope and coaxially sealed around its lip to the other surface of said second ceramic washer, one of said metal cups comprising said anode electrode and the other one of said metal cups comprising a second anode electrode.

15. A laser device comprising a longitudinally extending envelope having a central portion and two end portions, a first insulator member separating said central portion of said envelope from one end of said envelope, a second insulator member separating said central envelope portion from the other end portion of said envelope, at least one tubular cathode electrode within said central envelope portion, said first insulator member having a tubular portion coaxially aligned with said cathode electrode and extending between said central and one end envelope portions, a first anode electrode within said one end portion of said envelope and adjacent to said tubular portion of said first insulator member, a second insulator member having a tubular portion coaxially aligned with said cathode electrode and extending between said central and other end portions of said envelope, and a second anode electrode within said other end portion of said envelope and adjacent to said tubular portion of said second insulator member, the ratios of the length to the inside diameter of said tubular portions of said first and second insulator members being greater than 2.

16. A laser device in accordance with claim 15, wherein said tubular insulator portions are coaxially joined to the ends of said tubular cathode electrode.

17. A laser device in accordance with claim 15, wherein the inner surface of said tubular cathode electrode is coated with a vaporizable metal, and means for retaining said coated cathode surface at a temperature within a small range of values including the condensation temperature of said vaporizable metal.

* * * * *

UNITED STATES PATENT OFFICE
CERTIFICATE OF CORRECTION

PATENT NO. : 3,947,781
DATED : March 30, 1976
INVENTOR(S) : Karl Gerhard Hernqvist It is certified that error appears in the above-identified patent and that said Letters Patent are hereby corrected as shown below:

Title Page item [73] was omitted and should read

Assignee: RCA Corporation, New York, NY.

Title Page, Attorney, Agent or Firm

Delete "Don J. Flickinger" and substitute

--Glenn H. Bruestle and George E. Haas.--.

Signed and Sealed this

Third Day of August 1976

[SEAL]

*Attest:*

RUTH C. MASON
*Attesting Officer*

C. MARSHALL DANN
*Commissioner of Patents and Trademarks*